United States Patent [19]

Nozawa et al.

[11] Patent Number: 4,510,427
[45] Date of Patent: Apr. 9, 1985

[54] METHOD AND APPARATUS FOR CONTROLLING FEED SPEED IN NUMERICAL CONTROL SYSTEM

[75] Inventors: Ryoichiro Nozawa, Tokyo; Nobuyuki Kiya, Hachioji; Kunihiko Murakami, Hino, all of Japan

[73] Assignee: Fanuc Ltd., Minamitsuru, Japan

[21] Appl. No.: 478,730

[22] Filed: Mar. 25, 1983

[30] Foreign Application Priority Data

Mar. 29, 1982 [JP] Japan ................... 57-50306

[51] Int. Cl.³ .............................. G05B 11/18
[52] U.S. Cl. ................... 318/590; 318/443; 318/591; 318/632; 318/571; 364/181
[58] Field of Search ........... 318/571, 632, 592, 443, 318/591; 364/181

[56] References Cited

U.S. PATENT DOCUMENTS

| | | | |
|---|---|---|---|
| 3,466,515 | 9/1969 | Madsen et al. | 318/571 X |
| 3,557,350 | 1/1971 | Proctor | 235/151.11 |
| 3,611,102 | 10/1971 | Leenhouts | 318/696 |
| 4,027,222 | 5/1977 | Leenhouts | 318/591 |
| 4,090,120 | 5/1978 | Leenhouts | 318/590 X |
| 4,140,953 | 2/1979 | Dunne | 318/632 X |
| 4,141,065 | 2/1979 | Sumi et al. | 318/591 X |

FOREIGN PATENT DOCUMENTS 0024947 3/1981 European Pat. Off. .
2244295 4/1975 France .

*Primary Examiner*—B. Dobeck
*Attorney, Agent, or Firm*—Staas & Halsey

[57] ABSTRACT

A method and apparatus for controlling the feed speed of a machine in a numerical control system having a manual pulse generator for generating pulses in response to a manual operation. The numerical control system numerically controls the machine by supplying the machine with the generated pulses as feed pulses in a manual feed mode and with feed pulses corresponding to a commanded feed speed in modes other than the manual feed mode. The commanded feed speed is modified in accordance with an override quantity stored in a register. The method includes selectively designating the modes other than the manual feed mode, changing the override quantity, which is stored in the register, based on the pulses generated by the manual pulse generator and in accordance with the designated mode, and modifying the commanded feed speed in accordance with the override quantity stored in the register.

20 Claims, 4 Drawing Figures

FIG. I(A).
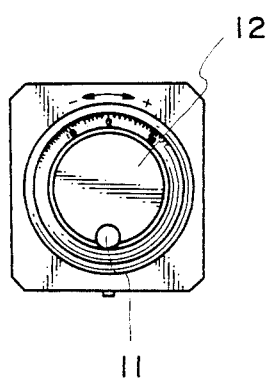
FIG. I(B).
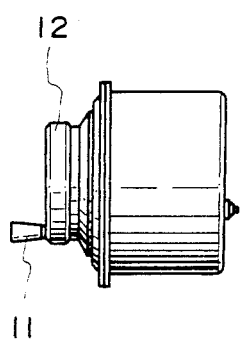
Fig. 2
AS 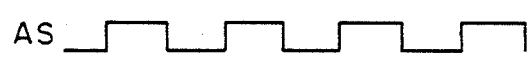
BS 

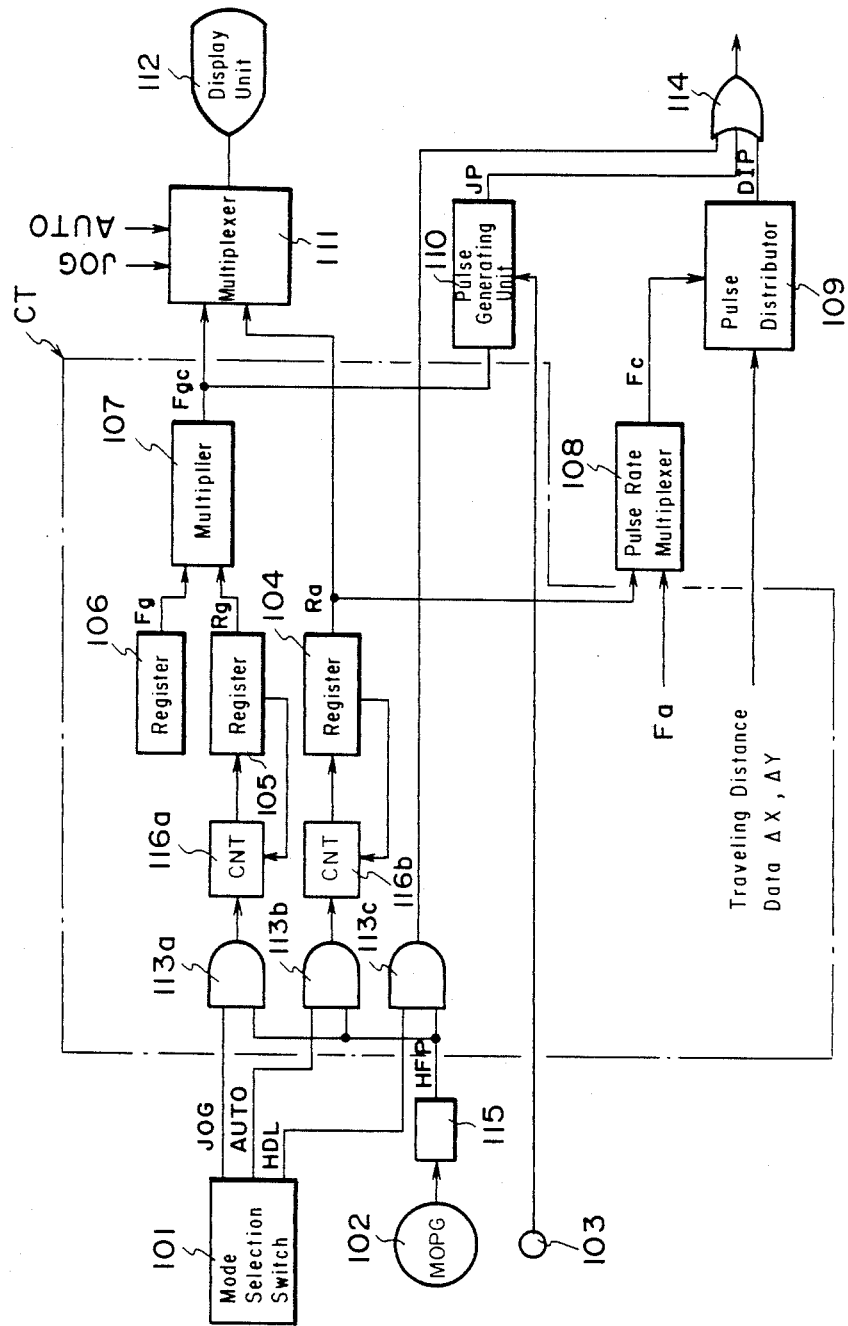

METHOD AND APPARATUS FOR CONTROLLING FEED SPEED IN NUMERICAL CONTROL SYSTEM

BACKGROUND OF THE INVENTION

This invention relates to a method and apparatus for controlling feed speed in a numerical control system which numerically controls the movement of a machine.

Numerical control systems are widely employed for numerically controlling the actions and movements of various machines, particularly machine tools. A numerical control system performs such control by supplying the servo system of the machine with feed pulses based on a commanded feed speed. Such a numerical control system has a feed speed override function for increasing or decreasing the commanded feed speed in accordance with a separately entered ratio, referred to as an override quantity. The feed speed override function makes it possible to change a commanded feed speed, which has already been programmed into the system, or a jog feed speed given by a parameter, into an optimum feed speed when desired.

According to the prior art, the feed speed override function is realized by providing an operator's panel, located on the machine side, with override quantity setting means that are utilized to change the override quantity in analog or digital fashion. This is a disadvantage, however, since such an arrangement requires the provision of special switches to serve as the override setting means, as well as numerous signal lines to carry the associated signals. The number of such lines becomes particularly large when the arrangement is such as to enable fine setting of the override quantity.

SUMMARY OF THE INVENTION

Accordingly, an object of the present invention is to provide a method and apparatus for controlling feed speed in a numerical control system, wherein an override quantity needed to change the pulse rate of feed pulses can be set without the provision of special switches and signal lines.

Another object of the present invention is to provide a method and apparatus for controlling feed speed in a numerical control system, wherein an override quantity can be finely set.

Still another object of the present invention is to provide a method and apparatus for controlling feed speed in a numerical control system, wherein an override quantity can be set with facility.

Still another object of the present invention is to provide a method and apparatus for controlling feed speed in a numerical control system, wherein an override quantity can be set by utilizing a manually operated pulse generator provided for feeding a machine by a manual operation.

A further object of the present invention is to provide a method and apparatus for controlling feed speed in a numerical control system, wherein pulses from a manually operated pulse generator can be utilized in setting an override quantity in a mode designated by a mode selection switch.

In accordance with the above objects the present invention includes a method and apparatus for controlling the feed speed of a machine in a numerical control system having a manual pulse generator for generating pulses in response to a manual operation. The numerical control system numerically controls the machine by supplying the machine with the generated pulses as feed pulses in a manual feed mode and with feed pulses corresponding to a commanded feed speed in modes other than the manual feed mode. The commanded feed speed is modified in accordance with an override quantity stored in a register. The method includes selectively designating the modes other than the manual feed mode, changing the override quantity, which is stored in the register, based on the pulses generated by the manual pulse generator and in accordance with the designated mode, and modifying the commanded feed speed in accordance with the override quantity stored in the register.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A and 1B are front and side views, respectively, of a manually operated pulse generator used in the present invention;

FIG. 2 is a waveform diagram showing the outputs of the pulse generator illustrated in FIG. 2; and FIG. 3 is a block diagram of an arrangement embodying the present invention.

DESCRIPTION OF THE PREFERRED EMBODIMENT

A numerical control system ordinarily is adapted to permit manual transport of a movable machine element, such as a table or tool of a machine tool. For this purpose, the numerical control system is equipped with a manually operated pulse generator in addition to a jog button. FIG. 1 shows the external appearance of the manually operated pulse generator, in which FIG. 1A is a front view and FIG. 1B is a side view. The pulse generator has a handle 11 and a rotating portion 12 to which the handle 11 is attached. When the rotational portion 12 is turned by means of the handle 11, the pulse generator produces an A-phase signal AS and a B-phase signal BS the phases of which are displaced from each other by 90 degrees. The number of pulses in each signal is proportional to the rotational angle of the handle 11, and the pulse rate is proportional to the speed at which the handle is turned. Turning the handle 11 in the forward or clockwise direction causes the phase of the signal AS to lead that of the signal BS, while turning the handle in the reverse or counter-clockwise direction causes the phase of the signal BS to lead. In accordance with a feature of the present invention, the manually operated pulse generator shown in FIG. 1 is used to set an override quantity in a manner described hereinafter.

Reference will now be had to the block diagram of FIG. 3 to describe a feed rate control apparatus embodying the present invention. The apparatus of the present invention includes a mode selection switch 101 of a push-button type for selecting the mode of a numerical control system. Such modes include an automatic run mode AUTO, a jog feed mode JOG and a manual pulse distribution mode HDL, the particular mode being activated when the respective output terminal of the mode selection switch 101 is set to logical "1". A manually operated pulse generator (MOPG) 102 having the construction shown in FIG. 1 is provided for generating the signals described in conjunction with FIG. 2. Numeral 103 denotes a jog feed button for designating jog feed. A register 104 is adapted to register an override quantity Ra (%) when the automatic run mode prevails, and a register 105 is adapted to register a jog override quantity Rg (%) when the jog feed mode is in effect. Both of these registers 104 and 105 are preset to a value of 100. A register 106 is provided for storing a jog feed speed Fg which serves as the effective jog feed speed for as long as Rg remains at 100 in the jog feed mode. This will be described in further detail later. A multiplier 107 takes the product of the jog override quantity Rg from the register 105 and the jog feed speed Fg from the register 106, producing a signal Fgc indicative of the result (i.e., Fgc=Fg×Rg). Thus the output Fgc of the multiplier 107 represents the jog feed speed Fg modified by the override value Rg(%) stored in register 105. A known pulse rate multiplexer 108 takes the product of the override quantity Ra (%) from register 104 and a commanded feed speed Fa, obtained from an arithmetic unit that is not shown, for producing pulses having a pulse rate Fc (=Ra×Fa). Thus the output of the pulse rate multiplexer 108 represents the commanded feed speed Fa modified by the override value Ra(%) stored in register 104. The output of the multiplexer 108 is applied to a known pulse distributor 109 for producing distributed pulses DIP by performing an arithmetic pulse distribution operation based on the multiplexer output and on input data ΔX, ΔY indicative of amount of movement along X and Y axes, respectively. A pulse generating unit 110, comprising a known digital differential analyzer, is adapted to generate a pulsed signal JP having a pulse rate proportional to the magnitude of the output Fgc from the multiplier 107. The pulses JP are generated only when the jog button 103 is held depressed. A multiplexer 111 having its output connected to a display unit 112 is responsive to the selected mode (JOG or AUTO, whichever is logical "1") to deliver either the jog feed speed Fgc, namely the output of multiplier 107, or the override quantity Ra (%) from the register 104, the display unit 112 responding by displaying Fgc or Ra(%). AND gates 113a, 113b and 113c each have a first input terminal connected to the JOG, AUTO and HDL outputs of the mode switch 101, respectively. The output of the AND gate 113c is connected to a three-input OR gate 114 whose two remaining inputs are the pulsed signal JP from the pulse generating unit 110 and the distributed pulse signal DIP from the pulse distributor 109. The output of the OR gate 114 is connected to the servo unit of a machine (not shown). An encoding circuit 115 receives the pulses generated by the manual pulse generator 102 and delivers the pulses upon attaching a sign conforming to the direction in which the handle 11 (FIG. 1) is turned. The pulses delivered by the encoding circuit 115, referred to as handle feed pulses HFP, are applied to the second input terminal of each of the AND gates 113a, 113b and 113c. Counting circuits 116a and 116b, receiving the outputs of AND gates 113a, 113b and of registers 105, 104, respectively, are adapted to either subtract the number of pulses from the corresponding AND gate, or add this number to, the contents of the corresponding register, depending upon the direction of rotation of handle 11. The registers 104 through 106, multiplier 107, AND gates 113a through 113c and counting circuits 116a, 116b comprise a control circuit CT.

In the operation of the apparatus illustrated in FIG. 3, AND gate 113c is opened when the manual pulse generation mode is selected (HDL=logical "1") by the mode selection switch 101. When the handle 11 of the manually operated pulse generator 102 is turned under this condition, the encoding circuit 115 delivers the handle feed pulses HFP having a sign in accordance with the direction of handle rotation. The number of pulses produced is a function of the amount of handle rotation. The handle feed pulses HFP are applied to the machine servo unit (not shown) through the open AND gate 113c and the OR gate 114, thereby transporting the table or tool of the machine.

The foregoing function performed by the manually operated pulse generator 102 is the originally intended function, whereby the tool or table is transported in accordance with the operation of the handle 11 of the pulse generator.

Now assume that the automatic run mode (AUTO=logical "1") is selected by the mode selection switch 101 to open the AND gate 113b. As mentioned above, the register 104 is preset to an initial value of 100 as an override quantity Ra (i.e., override quantity Ra=100%). As long as the manually operated pulse generator 102 is inactive, therefore, the pulse rate multiplexer 108 delivers pulses Fc indicative of the commanded feed speed Fa (Fc=Fa×1.0). These pulses are applied to the pulse distributor 109 which responds by generating distributed pulses DIP commensurate with the commanded feed speed Fa. These pulses are applied as feed pulses to the machine servo unit through the OR gate 114 and cause the servo unit to drive the machine element. When the handle 11 of the manually operated pulse generator 102 is turned in the automatic run mode, the handle feed pulses HFP, of positive or negative sign depending upon the direction of handle rotation, are fed from the encoding circuit 115 to the counting circuit 116b via the open AND gate 113b. The counting circuit 116b proceeds to count up or count down the contents of the register 104 depending upon the sign of the pulses HFP. By way of example, assume that the handle of the manually operated pulse generator 102 is rotated one-quarter turn in the reverse direction, where a full turn is equivalent to 100 pulses. This will cause the encoding circuit 115 to deliver 25 of the handle feed pulses HFP, indicative of the negative direction, so that the contents of register 104 will be counted down to a value of 75 (=100−25). Thus the override quantity Ra is changed from 100% to 75%. The result is that the pulse rate multiplexer 108 generates a pulse train indicative of a feed speed Fc which is 75% of the commanded feed speed Fa (i.e., Fc=Fa×0.75). The pulse distributor 109 responds by generating distributed pulses DIP commensurate with the pulse rate Fc (=Fa×0.75). Meanwhile, since the automatic run mode has been selected by the "1" logic at its AUTO input terminal, the multiplexer 111 delivers the override quantity Ra(%) to the display unit 112 where Ra is displayed. This simplifies the override adjustment by permitting the operator to observe the override value while turning the handle of the manual pulse generator 102.

Next, assume that the operator sets the mode selection switch 101 to the jog feed mode (JOG=logical "1") to open the AND gate 113a. As mentioned above, the register 105 is preset to an initial value of 100 as an override quantity Rg (i.e., override quantity Rg=100%). Also, the register 106 stores a jog feed speed Fg that will be delivered as the effective jog speed as long as Rg=100% holds in the present mode. Thus, when the jog feed button 103 is held depressed without first turning the manually operated pulse generator 102, the pulse generating unit 110 generates pulses JP indicative of the jog feed speed Fgc ($=Fg \times 1.00$) produced by the multiplier 107. The pulses JP are applied as feed pulses to the machine servo unit through the OR gate 114, the machine element being driven in response thereto. When the handle 11 of the manually operated pulse generator 102 is turned in the jog feed mode, the handle feed pulses HFP, of positive or negative sign depending upon the direction of handle rotation, are fed from the encoding circuit 115 to the counting circuit 116a via the open AND gate 113a. The counting circuit 116b proceeds to count the contents of register 105 up or count down depending upon the sign of the pulses HFP. For example, if the handle of the manually operated pulse generator 102 is rotated one-fifth turn in the reverse direction, then the encoding circuit 115 will deliver 20 of the handle feed pulses HFP, indicative of the negative direction, causing the contents of register 105 to be counted down to a value of 80 ($=100-20$). Thus the override quantity Rg is changed from 100% to 80%. The result is that the product delivered by the multiplier 107 is given by $Fg \times 0.80$, so that the pulse generating unit 110 now produces pulses JP indicative of a feed speed expressed by $Fg \times 0.80$. Owing to selection of the jog feed mode by the "1" logic at its JOG input terminal, the multiplexer 111 delivers the jog feed signal Fgc ($=Fg \times 0.80$) to the display unit 112 where Fgc is displayed. Thus, as mentioned above, adjustment of override is facilitated by permitting the operator to observe the jog feed speed while turning the handle of the manual pulse generator 102.

Note that the override quantity Ra(%) in the automatic run mode can be changed only when the handle feed pulses HFP are generated by operating the manual pulse generator 102 in the automatic run mode. Likewise, the override quantity Rg (%) in the jog feed mode can be changed only when the handle feed pulses HFP are generated by operating the manual pulse generator 102 in this mode. These override quantities Ra, Rg are stored in the respective registers 104 and 105. The feed speed is overridden on the basis of the override quantity Ra in register 104 when the automatic run mode is selected, and the jog feed speed is overridden on the basis of the override quantity Rg in the register 105 when the jog feed mode is selected.

In accordance with the present invention as described and illustrated hereinabove, various switches and signal lines for setting override quantities may be eliminated, thereby providing a numerical control system which is low in cost and simple to operate. Also, the override quantity and jog feed speed are displayed to simplify their adjustment.

As many apparently widely different embodiments of the present invention can be made without departing from the spirit and scope thereof, it is to be understood that the invention is not limited to the specific embodiments thereof except as defined in the appended claims.

We claim:
1. A method of controlling feed speed of a machine in a numerical control system having a manual pulse generator for generating pulses in response to a manual operation, wherein the numerical control system numerically controls the machine by supplying the machine with the generated pulses as feed pulses in a manual feed mode and with feed pulses corresponding to a commanded feed speed in modes other than the manual feed mode, the commanded feed speed being modified in accordance with an override quantity stored in a register, said method comprising the steps of:
   (a) selectively designating a mode other than the manual feed mode;
   (b) changing the override quantity, which is stored in the register, based on the pulses generated by the manual pulse generator and in accordance with the designated mode; and
   (c) modifying the commanded feed speed in accordance with the override quantity stored in the register.
2. A method according to claim 1, wherein one of the modes designated in step (a) is an automatic run mode.
3. A method according to claim 1, wherein one of the modes designated in step (a) is a jog feed mode, and the commanded feed speed modified in step (c) is jog feed speed.
4. A method according to claim 1, wherein one of the modes are selectively designated by a mode selection switch.
5. A method according to claim 1, wherein modes selectively designated in step (a) are an automatic run mode and jog feed mode, step (b) changes the override quantity, stored in a part of said register corresponding to the designated mode, based on the pulses generated by the manual pulse generator in the designated mode, and step (c) modifies the commanded feed speed when the designated mode is the automatic run mode and the jog feed speed when the designated mode is the jog feed mode.
6. A method according to claim 1, further comprising a step of displaying the changed override quantity.
7. A method according to claim 1, further comprising a step of displaying the modified commanded feed speed.
8. A method according to claim 5, further comprising a step of displaying the changed override quantity when the automatic run mode is designated in step (a) and the modified jog feed speed when the jog feed mode is designated in step (a).
9. A method according to claim 1, wherein the override quantity is changed in step (b) based on the number of the pulses generated by the manual pulse generator.
10. A method according to claim 1, wherein the commanded feed speed is modified in step (c) by multiplying the commanded feed speed by the override quantity.
11. An apparatus for controlling feed speed of a machine in a numerical control system having a manual pulse generator for generating pulses in response to manual operation, where the numerical control system numerically controls the machine by supplying the machine with the generated pulses as feed pulses in a manual feed mode and with feed pulses corresponding to a commanded feed speed in modes other than the manual feed mode, the commanded feed speed being modified in accordance with an override quantity, said apparatus comprising:
   a mode selection switch for selectively designating the modes other than the manual feed mode, and
   control circuit means, operatively connected to said mode selection switch and the manual pulse generator, having a register which stores the override quantity, for changing the override quantity based on the pulses generated by the manual pulse generator and in accordance with the mode designated by said mode selection switch, and for modifying the commanded feed speed by the override quantity.

12. An apparatus according to claim 11, wherein said mode selection switch to designates an automatic run mode as a mode other than the manual feed mode.

13. An apparatus according to claim 11, wherein said mode selection switch designates a jog feed mode as a mode other than the manual feed mode, and said apparatus further comprising a register for storing jog feed speed as the commanded feed speed.

14. An apparatus according to claim 11, wherein said mode selection switch selectively designates an automatic run mode and jog feed mode, said register comprises a first register for storing an override quantitiy used in an automatic run mode, and a second register for storing an override quantity used in a jog feed mode, and said control circuit includes means for changing the override quantity, stored in the first or second register corresponding to the mode designated by said mode selection switch, based on the pulses generated by the manual pulse generator in the designated mode, and means for modifying the commanded feed speed when the designated mode is the automatic run mode and the jog feed speed when the designated mode is the jog feed mode.

15. An apparatus according to claim 14, further comprising display means, operatively connected to said control circuit, for displaying the changed override quantity when the automatic run mode is designated and the modified jog feed speed when the jog feed mode is designated.

16. An apparatus according to claim 11, further comprising display means, operatively connected to said control circuit, for displaying the changed override quantity.

17. An apparatus according to claim 11, further comprising display means, operatively connected to said control circuit, for displaying the modified commanded feed speed.

18. An apparatus according to claim 11, wherein said control circuit changes the override quantity based on the number of the pulses generated by the manual pulse generator.

19. An apparatus according to claim 11, wherein said control circuit further includes multiplying means for modifying the commanded feed speed by multiplying the commanded feed speed by the override quantity.

20. An apparatus for controlling feed speed of a machine in a numerical control system, comprising:
   a jog signal generator;
   a mode selection switch;
   pulse means for generating feed pulses;
   gate means, operatively connected to said mode selection switch and said pulse means, for transmitting the feed pulses in dependence upon the position of said mode selection switch;
   count means, operatively connected to said gate means, for counting the feed pulses;
   a first register for storing a jog feed speed;
   a second register, operatively connected to said count means, for storing a jog override quantity;
   a third register, operatively connected to said count means, for storing a command override quantity;
   multiply means, operatively connected to said first and second registers, for producing a modified jog feed speed;
   pulse generating means, operatively connected to said multiply means and said jog signal generator, for generating modifed jog feed pulses;
   pulse rate multiplexer means, operatively connected to said third register and to receive a commanded speed, for generating a modified commanded speed;
   pulse distribution means, operatively connected to said pulse rate multiplexer means and to receive movement data, for generating distributed pulses based on the modified commanded speed and the movement data;
   an OR gate, operatively connected to said gate means, said pulse generating means and said pulse distribution means, for outputting the feed speed pulses; and
   display means, operatively connected to said multiply means, said third register and said mode selection switch, for displaying the modified jog feed speed or the commanded override quantity in dependence upon the position of the mode selection switch.

* * * * *

UNITED STATES PATENT AND TRADEMARK OFFICE
CERTIFICATE OF CORRECTION

PATENT NO. : 4,510,427

DATED : April 9, 1985

INVENTOR(S) : NOZAWA ET AL.

It is certified that error appears in the above-identified patent and that said Letters Patent is hereby corrected as shown below:

Col. 7, line 4, delete "to";

Col. 8, line 1, delete "for".

Signed and Sealed this

Twentieth Day of August 1985

[SEAL]

Attest:

DONALD J. QUIGG

Attesting Officer     Acting Commissioner of Patents and Trademarks